(12) United States Patent
Mountain

(10) Patent No.: US 8,732,754 B2
(45) Date of Patent: May 20, 2014

(54) EXPANDED PROGRAMMING GUIDE

(75) Inventor: Dale Llewelyn Mountain, West Yorkshire (GB)

(73) Assignee: Eldon Technology Limited, Steeton, Keighley (GB)

( * ) Notice: Subject to any disclaimer, the term of this patent is extended or adjusted under 35 U.S.C. 154(b) by 0 days.

(21) Appl. No.: 13/473,392

(22) Filed: May 16, 2012

(65) Prior Publication Data

US 2012/0297420 A1 Nov. 22, 2012

(30) Foreign Application Priority Data

May 20, 2011 (EP) .................................... 11166991

(51) Int. Cl.
- G06F 3/00 (2006.01)
- G06F 13/00 (2006.01)
- H04N 5/445 (2011.01)

(52) U.S. Cl.
USPC .................................. 725/39; 725/44; 725/53

(58) Field of Classification Search
USPC ........... 725/37, 38, 39, 40, 43, 44, 45, 47, 52, 725/53
See application file for complete search history.

(56) References Cited

U.S. PATENT DOCUMENTS

| | | | |
|---|---|---|---|
| 5,793,438 A | 8/1998 | Bedard | |
| 6,577,350 B1 * | 6/2003 | Proehl et al. | 348/564 |
| 7,844,987 B2 * | 11/2010 | Kelts | 725/44 |
| 2003/0011636 A1 | 1/2003 | Feroglia et al. | |
| 2008/0163047 A1 * | 7/2008 | Gossweiler et al. | 715/277 |
| 2008/0270449 A1 | 10/2008 | Gossweiler et al. | |
| 2008/0270886 A1 | 10/2008 | Gossweiler et al. | |
| 2008/0320393 A1 | 12/2008 | Roberts et al. | |
| 2010/0333139 A1 | 12/2010 | Busse et al. | |

FOREIGN PATENT DOCUMENTS

| | | |
|---|---|---|
| EP | 1622372 A2 | 2/2006 |
| EP | 2207346 A1 | 7/2010 |
| WO | 2008002378 A1 | 1/2008 |

OTHER PUBLICATIONS

European Patent Office "Extended European Search Report" mailed Jul. 29, 2011; European Patent Appln. No. 11166991.7.
European Patent Office, Communication pursuant to Article 94(3) EPC for European Patent Application No. 11 166 991.7, mailed Nov. 29, 2013.

* cited by examiner

*Primary Examiner* — John Schnurr
(74) *Attorney, Agent, or Firm* — Ingrassia Fisher & Lorenz, P.C.

(57) ABSTRACT

Systems, methods and computer program products utilize a content receiver to generate a dynamically modifiable expanded programming guide with a grid containing a plurality of regions. Each region is associated with a plurality of channels over a timeframe. The content receiver transmits the expanded programming guide to a content display. The grid may be utilized to navigate through regions and therefore across a large amount of programming information associated with a wide range of channels and timeframes. The content receiver may transmit a magnified view of the expanded programming guide and may display content-related information associated with a subset of regions for the associated channels and timeframes.

14 Claims, 12 Drawing Sheets

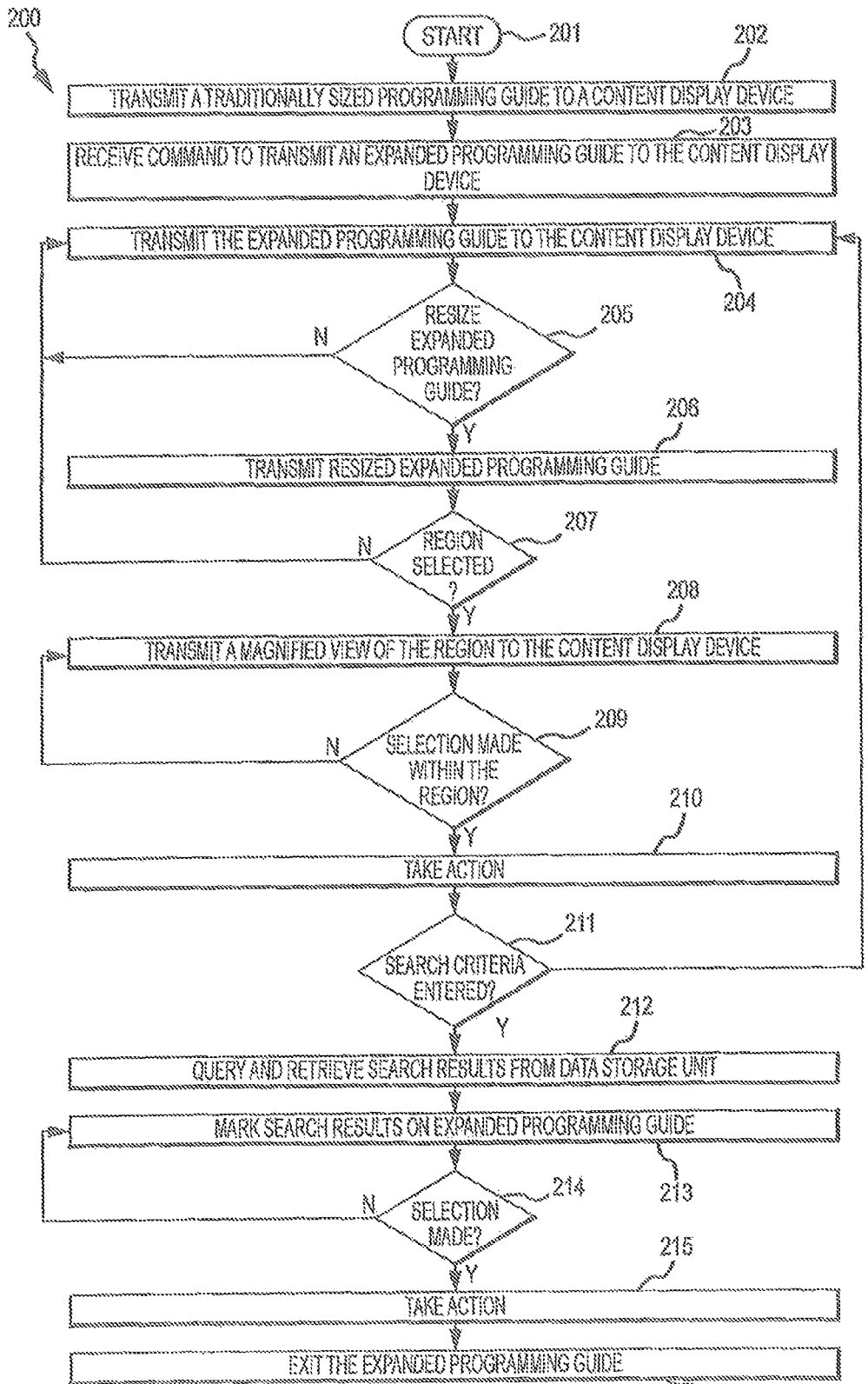

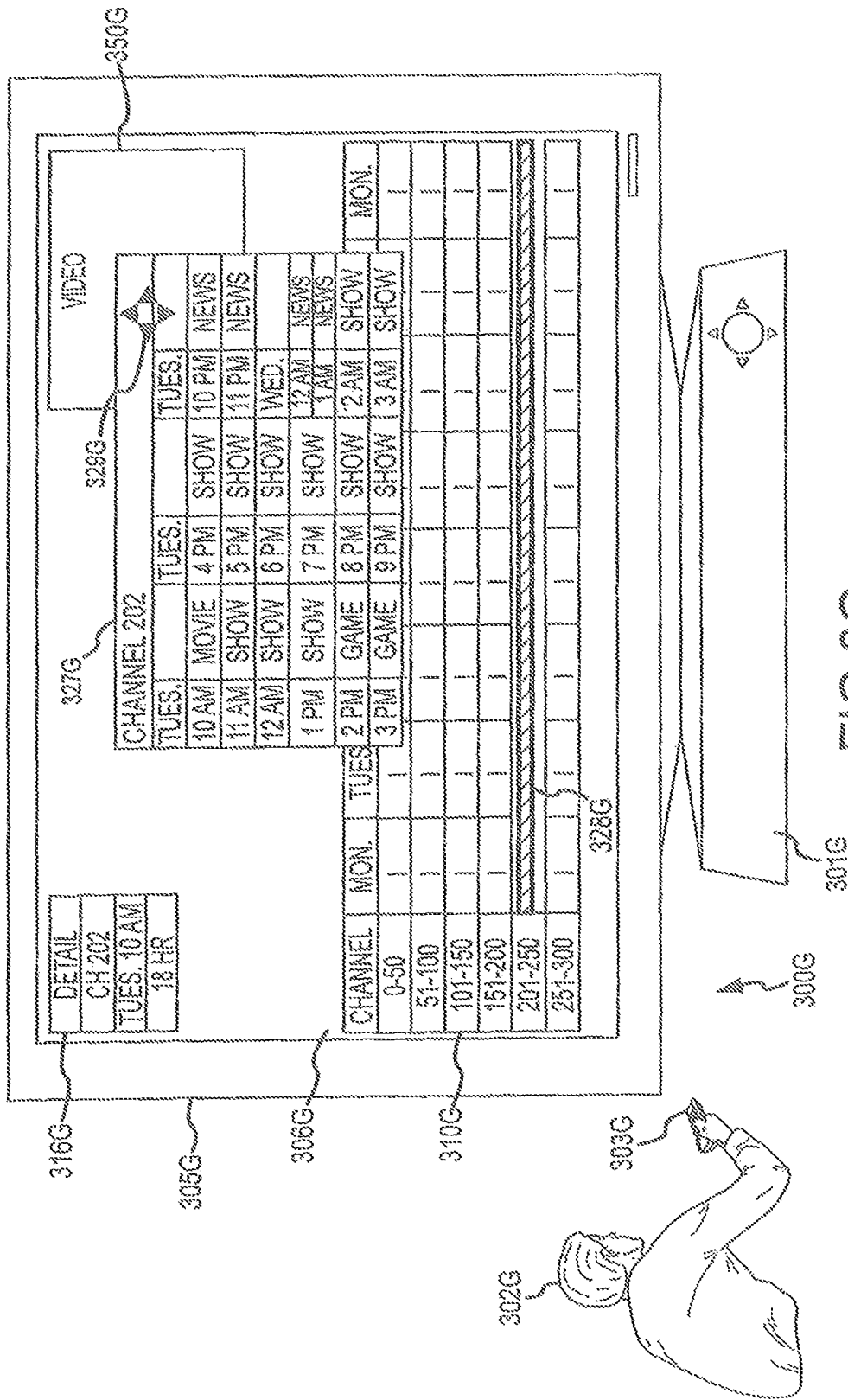

EXPANDED PROGRAMMING GUIDE

CROSS-REFERENCES TO RELATED APPLICATIONS

This application claims priority to European Application No. 11166991.7, filed May 20, 2011.

TECHNICAL FIELD

This disclosure relates generally to providing expanded programming guides utilizing content receivers. The expanded programming guided may include search functions.

SUMMARY

The invention is defined in the claims to which reference is now directed. Various additional features are set out in the dependent claims.

Systems, methods and computer program products utilize a content receiver to generate a first view of an expanded programming guide that provides a grid of a plurality of regions corresponding to a plurality of channels over a timeframe. The grid is displayed on a content display device and provides a map of the expanded programming guide enabling navigation over of a large amount of programming information, for example, spanning several days and several hundred channels. The regions within the grid enable navigation to an area of interest within the grid. The region representing a large amount of channel and programming information over a longer timeframe is relatively small, and the regions displayed generally do not include programming details for the associated channels over the associated timeframe. In order to view the programming details (e.g., programming events (such as show titles), programming event details (such as synopsis, runtime, actors), recording options) associated with the channels within the region, one or more of the plurality of regions may be selected and programming details for the plurality of channels within the timeframe may then be transmitted to a content display device. Upon selecting a region, the detailed view enables programming selections to be entered (such as switching the channel to view the program, record the program, view additional details related to the program, and the like). For example, a magnified view of the one or more of the plurality of regions may be displayed, which may include a listing of channels, times, associated programming events, and selections related to the associated programming events may be entered within the magnified view.

In one implementation, a method utilizes a content receiver to provide an expanded programming guide and involves generating a programming guide having a grid of a plurality of regions, where each region is associated with a plurality of channels in a timeframe; configuring, by the content receiver, the grid to display a first view of the plurality of regions; receiving a selection of one or more of the plurality of regions; in response to receiving the selection, generating an expanded display of the one or more of the plurality of regions relative to the remainder of the plurality of regions, thereby creating an expanded programming guide having a number of cells. Further, in response to receiving the selection, the method populates a subset of the number of cells with content-related data for each of the plurality of channels in the expanded programming guide. The content receiver transmits the expanded programming guide to a content display device.

In another implementation, a content receiver provides an expanded programming guide and includes a processing unit configured to generate a dynamically modifiable expanded programming guide including a grid of a plurality regions, each region associated with a plurality of channels over a timeframe; a memory unit configured to store programming information for each of the plurality of channels from the expanded programming guide; and a communications unit for transmitting the expanded programming guide to a content display device and for receiving selection signals. The processing unit generates a first view of the expanded programming guide showing the plurality of regions associated with the plurality of channels over the timeframe. The communications unit receives a selection signal, and in response, the processing unit generates an expanded programming guide showing of a subset of the plurality of regions corresponding to a subset of the timeframe. The communications unit transmits the expanded guide to a display for rendering.

In another implementation, a computer program product includes instructions stored in at least one non-transitory machine readable medium, executable by at least one processing unit for providing an expanded programming guide. A first set of instructions causes the processing unit to generate a dynamically modifiable expanded programming guide including a grid of a plurality regions, each region associated with a plurality of channels over a timeframe. A second set of instructions causes the processing unit to transmit a first view of the expanded programming guide showing the plurality of regions associated with the plurality of channels over the timeframe. A third set of instructions causes the processing unit to transmit an expanded programming guide showing of a subset of the plurality of regions corresponding to a subset of the timeframe in response to receiving a selection signal.

Various embodiments may provide a method for utilizing a content receiver to provide an expanded programming guide, the method comprising: generating a programming guide comprising a grid of a plurality of regions, each region associated with a plurality of channels in a timeframe; configuring, by the content receiver, the grid to display a first view of the plurality of regions; receiving a selection of one or more of the plurality of regions; in response to receiving the selection, generating an expanded display of the one or more of the plurality of regions relative to the remainder of the plurality of regions, thereby creating an expanded programming guide having a number of cells; further in response to receiving the selection, populating a subset of the number of cells with content-related data for each of the plurality of channels in the expanded programming guide; and transmitting, from the content receiver, the expanded programming guide to a content display device.

The expanded programming guide may appropriately comprise a magnified view of the programming guide.

Various embodiments of the method then further comprise receiving a programming selection selecting the content-related data within the expanded programming guide.

In the method, the expanded programming guide is preferably transmitted as an overlay to the programming guide.

The expanded programming guide is suitably dynamically configurable to enable selection of a plurality of display types of the expanded programming guide.

The method suitably further comprises receiving input for selecting a configuration of the grid of the plurality of regions, wherein the grid of the plurality of regions is dynamically configurable to enable at least one of the plurality of channels and the timeframe associated with each region to be selected.

The method may further comprise receiving input for selecting a configuration of the grid of the plurality of regions, wherein the grid of the plurality of regions is dynamically configurable to enable the plurality of channels associated with each region to be grouped by channel programming category.

The method may involve the content receiver receiving search criteria, and in response, the content receiver transmits the programming guide with marked regions, the marked regions associated with one or more channels and timeframes matching the search criteria. In various embodiments the method may further comprise receiving a selection of one or more of the marked regions, and in response to receiving the selection, generating the expanded display with wherein the content receiver receives search criteria, and in response, the content receiver transmits the expanded programming guide with marked regions, the marked regions associated with channels and timeframes matching the search criteria.

Various embodiments may provide a content receiver for providing an expanded programming guide, comprising: a processing unit configured to generate a dynamically modifiable expanded programming guide comprising a grid of a plurality regions, each region associated with a plurality of channels over a timeframe; a memory unit configured to store programming information for each of the plurality of channels from the expanded programming guide; and a communications unit for transmitting the expanded programming guide to a content display device and for receiving selection signals. The processing unit may be operable to generate a first view of the expanded programming guide showing the plurality of regions associated with the plurality of channels over the timeframe; the communications unit may be operative to receive a selection signal. The processing unit may be further operative to generate, in response to the selection signal, an expanded programming guide showing of a subset of the plurality of regions corresponding to a subset of the timeframe; and the communications unit may be further operative to transmit the expanded guide to a display for rendering. A number of preferable features of the content receiver are indicated below. It should be understood that any of these preferable features may be used with each other in any combination.

In various embodiments, the communications unit transmits the expanded programming guide showing the subset of the plurality of regions comprising a number of cells with content-related data for each of the plurality of channels in the subset of the plurality of regions. Further, the processing unit is suitably configured to receive a programming selection selecting the content-related data.

The expanded programming guide showing the subset of the plurality of regions preferably comprises a magnified view of the first view of the expanded programming guide.

The expanded programming guide showing the subset of the plurality of regions is preferably transmitted by the communications unit as an overlay to the first view of the expanded programming guide.

The first view of the expanded programming guide and the expanded programming guide showing the subset of the plurality of regions are preferably dynamically configurable utilizing the processing unit to enable selection of a plurality of display types.

The processing unit suitably dynamically configures the grid of the plurality of regions by enabling selection of at least one of the plurality of channels and the timeframe associated with each region.

The processing unit suitably dynamically configures the grid of the plurality of regions by enabling the plurality of channels associated with each region to be grouped by channel programming category.

The processing unit is suitably further configured to execute a search of the programming information stored in the memory unit, and the communications unit is configured to transmit the first view of the expanded programming guide with marked regions associated with one or more channels and timeframes matching the search criteria.

Embodiments may also provide a computer program product comprising: a first set of instructions, stored in at least one non-transitory machine readable medium, executable by at least one processing unit to generate a dynamically modifiable expanded programming guide comprising a grid of a plurality regions, each region associated with a plurality of channels over a timeframe; and a second set of instructions, stored in the at least one non-transitory machine readable medium, executable by the at least one processing unit to transmit a first view of the expanded programming guide showing the plurality of regions associated with the plurality of channels over the timeframe; and a third set of instructions, stored in the at least one non-transitory machine readable medium, executable by the at least one processing unit to transmit an expanded programming guide showing of a subset of the plurality of regions corresponding to a subset of the timeframe in response to receiving a selection signal.

In various embodiments, the computer program further comprises a fourth set of instructions, stored in the at least one non-transitory machine readable medium, executable by the at least one processing unit to transmit the expanded programming guide showing of the subset of the plurality of regions comprising a number of cells with content-related data for each of the plurality of channels in the subset of the plurality of regions.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIG. 2 is a flow chart illustrating a method for providing an expanded programming guide utilizing a content receiver. This method may be performed by the system of FIG. 1.

FIGS. 3A-3J are diagrams illustrating a system for providing an expanded programming guide with search capabilities utilizing a content receiver. The system may be the system of FIG. 1.

DETAILED DESCRIPTION OF EXEMPLARY EMBODIMENTS

Figure 1:
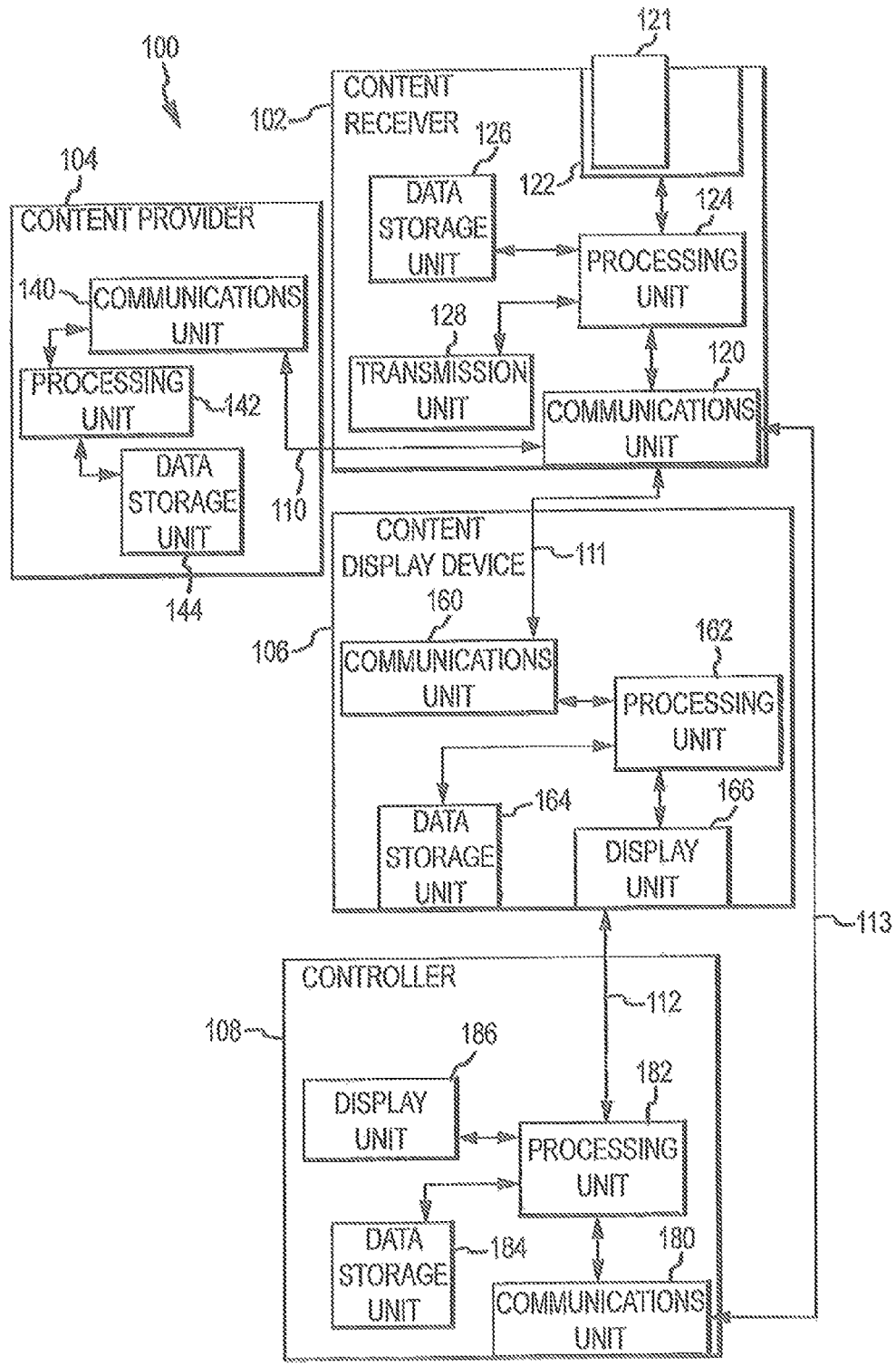
FIG. 1 is a block diagram illustrating a system for providing an expanded programming guide utilizing a content receiver.

The description that follows includes sample systems, methods, and computer program products that embody various elements of the present disclosure. However, it should be understood that the described disclosure may be practiced in a variety of forms in addition to those described herein.

Electronic devices such as content receivers (like set top boxes) generally receive content from a content stream and decode and transmit the video, audio and metadata content from the content stream to a content display device (such as a television). The metadata content generally includes a collection of programming information such as programming details corresponding to programming provided by the various channels supported by the content stream. The programming information is utilized by the content receiver to generate an on screen display that includes a programming guide. The traditional programming guide is a grid of times (x-axis) and channels (y-axis) and programming events (such as show titles for television shows) listed within blocks forming the grid. The programming events are generally alpha-numeric symbols identifying show titles.

When the user desires to view past, present or future programming details (such as programming event details), the user generally enters a selection from a controller (such as a remote control) that generates a command for the content receiver to transmit the programming guide to the content display device. The user may scroll through the grid of listed programming events and select a programming event of interest. For example, the content receiver may transmit an image of a cursor or a highlighted overlay that may be used as a navigation and selection tool. Navigating to a block showing the programming block enables the user to select the block, and depending on the type of selection entered, the content receiver generally takes some action. For example, the content receiver may change the channel to the programming event selected, transmit details on the programming event (such as date, time, duration, synopsis, and the like) to the content display device, transmit a confirmation about the user's selection, such as a confirmation that the selected programming event is to be recorded (such as by utilizing a digital video recorder ("DVR") feature of the content receiver or a DVR communicatively coupled thereto), and so on. Generally, content receivers generate traditional programming guides that display about 2-3 hours of programming for about 7-10 channels. The user generally scrolls up and down and views programming events for different channels, and scrolls left and right to view future and past programming events for the channels displayed. For example, for a traditional programming guide initially displaying programming events for channels 12-22 from 10 am to 1 pm, the user scrolls up to view programming events for channels 1-12 during the same 3-hour timeframe. Alternatively, from the initially displayed traditional programming guide, the user scrolls to the right to view the programming events for the 2 pm to 5 pm timeframe for the initial channels 12-22. As a result, programming event information displayed on the programming guide is limited to a relatively short predefined period of time and for a relatively small predefined number of channels.

Some content receivers are programmed to enable the image of the traditional programming guide to "jump" by a number of hours, such as by 12 hours. In this case, using the example of the initial channels 12-22 at 10 am to 1 pm from the traditional programming guide, the user may select a "jump" command (such as utilizing a button on a controller) to move the programming guide by 12 hours to 10 pm to 1 am for the initial channels 12-22. In addition, the content receiver may receive a numerical entry corresponding to a channel for which the programming guide is to display the programming events. This enables the programming guide to quickly move to a relatively remote section of channels, e.g., from channels 12-22 to channels 300-310, but for the same initial timeframe of 10 am to 1 pm. Even with the time "jump" feature and the ability to quickly move to different channels for viewing programming events on the traditional programming guide, navigating through large amounts of programming guide information can be difficult, and the traditional programming guide only provides a view of programming events for a limited time and channel range.

Further, some content receivers are also programmed to enable the user to search for programming events utilizing the content receiver. Generally, the user may utilize a controller to enter alpha-numeric search criteria into the content receiver for query and retrieval functions. For example, a user desiring to search for a sporting event, such as a tennis match, may enter tennis-related search criteria into a search field displayed on display unit of the content display device, and the content receiver retrieves information matching the entered search criteria. However, the search results may generally be provided in a list format, and may not be in a grid view of the traditional programming guide. Even when the search result is provided in a grid view of the traditional programming guide, the view is limited to the relatively small time and channel range described above.

The present disclosure discloses systems, methods and computer program products utilizing a content receiver to generate an expanded programming guide that provides the user with a view of an expanded programming guide over a wider range of dates and times and/or channels. The expanded programming guide provided herein provides multiple views of the programming information including a relatively large view, such as a global or a landscape view of the programming guide information available at a given time as well as magnified views that may show content-related information. For example, an expanded programming guide stored in the memory unit of a content receiver for a 7-day time period may be partially or entirely viewable in a grid format on a display unit (such as a display screen) of a content display device (such as a television). The grid of the expanded programming guide is a grid of timeframes (x-axis) and channel ranges (y-axis), and defines a plurality of regions bounded by timeframe borders and channel borders. The timeframes and channel ranges may be consecutively arranged. The timeframe represented between successive timeframe borders is relatively longer compared to the traditional programming guide. For example, a bounded timeframe may correspond to between 1 and 24 hours. The channel range represented between successive channel borders generally corresponds to a plurality of channels. For example, a bounded channel range may correspond to between 5 and 100 channels. Accordingly, the regions represent plurality of channels over a relatively long timeframe compared to the traditional programming guide generally providing boxes showing a programming event for a single channel over a time period.

The size of the displayed expanded programming guide compared to the traditional programming guide may be relatively similar. Due to the large amount of information represented by the regions (e.g., several channels with associated programming events over several hours), and because the size of the expanded programming guide is limited to a the display screen of a content display unit or a portion thereof, the regions may not show programming details (e.g., programming events (show title), runtime, actors) for all associated channels during the timeframe. Therefore, the regions of the grid may include an identifier that displays a general indication of the channels (e.g., channel 1-50) and timeframe (e.g., Monday) associated therewith, but not necessarily content-related information, such as channel programming details. Because the regions are within the grid having an x-axis representing timeframe and y-axis representing channel range (or vice versa), the regions may not display text related to the channel range and timeframe, and instead the x-axis and y-axis identifiers may serve as a region identifier serving as an indication for the channels and timeframe each region represents. In some implementations, the regions may be color coded, may include symbols, may be customizable by the user, and so on.

According to certain implementations, the grid of regions forming at least one view of the expanded programming guide provides a map enabling navigation over of a large amount of programming information, for example, spanning several days and several hundred channels. The user may navigate through the expanded programming guide and select a portion of the grid for magnification or expansion (e.g., to zoom in and to zoom out). The view of the expanded programming guide may be dynamically changed, for example, utilizing a controller and/or menu selections. By expanding or zooming-out the view of the expanded programming guide, the user may navigate quickly to other portions. By magnifying or zooming-in the view of the expanded programming guide, an expanded display of the one or more of the plurality of regions relative to the remainder of the plurality of regions may be generated, thereby creating another view of the expanded programming guide having a number of cells including content-related information. Accordingly, the expanded programming guide may be magnified to a degree in which content-related information is shown therein and may be selected. Alternatively, the expanded programming guide may be magnified to a degree in which one or more regions of interest may be selected for detailed viewing, described below.

In some implementations, a region within the grid may be selected for detailed viewing of programming events within the region. Detailed viewing may involve magnifying certain details for the region (such as channels, date(s), times, programming events, synopses, actors, runtime, recording options, and so on). For example, a user viewing the expanded programming guide may navigate to a region within the grid (such as a region corresponding to Monday, Channels 1-50) and select the region. The content receiver may then transmit programming details for the region selected such as by transmitting another view of the expanded programming guide. For example, a magnified image of the region or a portion of the region may enable the user to view the programming events for channels 1-50 on Monday and to make selections within the magnified region (such as a channel selections, record selections, programming event details selections, and so on). The magnified region forming another view of the expanded programming guide may be provided as a window that overlays the first view of the expanded programming guide. Providing an expanded programming guide with a plurality of regions enables the user to navigate over a large amount of programming guide information, and magnifying a region within the expanded programming guide enables detailed viewing of content-related information within the cells as well as selection entry by the user.

Further, the present disclosure, in some implementations, provides systems and methods for searching an expanded programming guide to enable a user to view search results within the grid of the expanded programming guide. For example, in a grid showing a plurality of regions representing multiple days for hundreds of channels of the expanded programming guide, search results may be marked (such as by a transparent color overlay or highlight) over the underlying expanded programming guide. For example, a portion or the entire region associated with a programming event for a channel represented by the region may be marked. The user may navigate to one or more of the marked search results within the expanded programming guide and magnify the region including the marked search result. The magnified view of the search result(s) within another view of the expanded programming guide enables the user to view details and make selections related to the search results (such as selecting the channel, recording, or viewing further details related to the search results), similar to the magnified view described above.

FIG. 1 is a block diagram illustrating a system 100 for providing an expanded programming guide utilizing a content receiver. The system 100 includes a content receiver 102 (such as a set top box) for receiving, storing and transmitting content including video, audio and medatata content (for example corresponding to programming information such as programming events, event details and so on) television programming and on screen display content), a content provider 104 (such as a satellite or cable programming service provider) for transmitting the content, a content display device 106 (such as a television) for receiving and displaying the content, and a controller 108 (such as a remote control) for transmitting data such as control signals to the content receiver 102.

The content receiver 102 is a device for receiving content from the content provider 104 and other external sources, for processing or decoding the content and for transmitting the content to the content display device 106. The content receiver 102 is, for example, a set top box, a television receiver, a digital video recorder, a computing device, a gaming device, or a television, which is generally located at a user's location (such as a user's residence or business). The content receiver 102 is operable to receive content from the content provider 104 (and/or another external source) by way of the transmission link 110.

Such content is received by the communications unit 120 of the content receiver 102. The content receiver 102 is also operable to receive content from an external source 121 by way of data port 122 (e.g., USB port). For example, the data port 122 may be a USB port connectable to a flash drive, a mobile computing device such as a phone (e.g., a smart phone and/or a camera phone), a digital tablet, and the like. The data from the content provider 104 and the external source 121 is provided to the processing unit 124, which executes instructions stored in the data storage unit 126 and provides content to the content display device 106 and/or audio speakers via the transmission unit 128. The transmission unit 128 is communicatively coupled to the content display device 106 by way of the processing unit 124, the communications unit 120 and the transmission link 111. The processing unit 124 also executes instructions stored in the data storage unit 126 for generating a dynamically configurable and searchable expanded programming guide.

The content provider 104 (such as a satellite programming company, a cable company, an Internet service provider, e.g., an online video service or Internet video provider, and the like) is generally remotely located from the content receiver 102. The content provider 104 utilizes a communications unit 140, a processing unit 142 and a data storage unit 144 to receive, manage and store content, which is transmitted by the communications unit 140 to the communications unit 120 of the content receiver 102 via the transmission link 110. It will be appreciated that the content provider 104 may transmit metadata associated with programming (such as programming information) for a predefined time period, such as several days to several weeks. Although not shown, a video player (such as DVD player) or a video recorder (such as a DVR) may also be communicatively coupled to the content receiver 102 by way of the transmission link 110.

The content display device 106 is generally arranged proximate to and is communicatively coupled to the content receiver 102 and displays content including video content and on screen display content including programming information that may be displayed as an expanded programming guide. While content display device 106 and the content receiver 102 are depicted as separate components in FIG. 1, the content receiver 102 may be incorporated with the content display device 106. The content display device 106 is, for example, a television, a computer screen, a video screen, or any other display device for displaying content. The content display device 106 includes a communications unit 160, which receives content from the communications unit 120 of the content receiver 102 by way of the transmission link 111, a processing unit 162 for executing instructions stored in a data storage unit 164, and a display unit 166 for displaying the content received from the content receiver 102. The content display device 106 is configured to display expanded programming guides transmitted by the content receiver 102, described further below.

The controller 108 is generally provided in an area proximate the content receiver 102 and communicatively coupled to the content display device 106 by way of the transmission link 112, and to the content receiver 102 by way of the transmission link 113. The controller 108 is, for example, a remote control, such as a universal remote control, a dedicated remote control, or a computing device programmed to send command signals to the content receiver 102. The controller 108 includes a communications unit 180 for sending and receiving information, a processing unit 182 for executing instructions stored in a data storage unit 184, and an optional display unit 186 for displaying or presenting information stored within the data storage unit 184 such as information related to a command sent to the content receiver 102. The controller 108 may be utilized to navigate and select information displayed on the expanded programming guide (e.g., zoomed-in portion of the expanded programming guide and magnified regions of the expanded programming guide), described further below.

Returning to the content receiver 102, the processing unit 124 executes instructions stored in the data storage unit 126 for generating a plurality of views of the expanded programming guide. In some implementations, the expanded programming guide is a view of the programming events available for a given time period such as 7 days. The expanded programming guide may be viewable for a predefined or user-selected time period such as 6, 18, 24, or 36 hours; 2, 3, 4, 5, 6, 7, 8, 9 or 10 days; 1, 2, 3 or 4 weeks; and so on. Regions within the expanded programming guide may correspond to a portion of the region's timeframe, such as 1-hour regions for a 6-hour expanded programming guide, 3-hour regions for a 24-hour programming guide, 1-day region for a 7-day expanded programming guide, and so on.

According to certain implementations, the expanded programming guide generated by the content receiver 102 spans a large amount of time and channels, meaning the expanded programming guide would be required to reduce the size of text identifying programming (such as events, dates, times and channels) within the regions down to a size that would normally be unreadable by the user. That is, the expanded programming guide may show programming information for such a relatively large period of time and/or for a relatively large number of channels in the viewable region of display unit 166 of the content display device 106, that the resulting information in the region would need to shrink down to an unreadable size.

In some implementations, the expanded programming guide may be magnified or expanded so that the expanded programming guide is resized and transmitted to the content display device 106 by the content receiver 102. Resizing of the expanded programming guide may be an iterative or stepwise operation, in which successively larger or smaller amounts of detail (such as timeframes, channel ranges and programming information) is shown. Alternatively, resizing the expanded programming guide may be a linear operation in which the amount of detail gradually becomes larger or smaller. For example, the expanded programming guide may be expanded or magnified so that the expanded programming guide includes information for between 1 and 5000 channels that spans a timeframe of between 0.5 hours to several weeks.

The expanded programming guide may include a grid of regions and the processing unit 124 may define each region as a segment of channels and a segment of time within the expanded programming guide. For example, a region may encompass a grouping of channels that is smaller than the number of channels displayed by the expanded programming guide (such as a region of 1-5, 5-10, 1-10, 1-15, 5-15, or 10-15, 15-50 channels for an expanded programming guide for 50-500 channels). The timeframe associated with the region may be shorter than the timeframe associated with the expanded programming guide (such as a region of 0.25-0.5 hours for a 6 hour expanded programming guide, 1.0-2.0 hours for a 12 hour expanded programming guide, 3 hours for an 18 hour expanded programming guide, or 24 hours for a 7-day expanded programming guide). As described below, the regions may be magnified to display programming details associated with the regions (e.g., the programming events for the channels and timeframes associated with the regions), thereby creating another view of the expanded programming guide having a number of cells including content-related information therein.

The content receiver may also execute instructions for magnifying a particular region within the expanded programming guide to create another view of the expanded programming guide. The magnified region may be arranged as an overlay to the expanded programming guide and may display a magnified view for one or more specified regions of the expanded programming guide. For example, the magnified region may display the programming information at a size that would be considered commonly readable or perceptible by the user to enable the user to make decisions about the information displayed (such as selecting to view the channel, record the programming event, view further detail for the programming event, and so on). In some implementations, the magnified view may take the place of the expanded programming guide and thereby an expanded programming guide may be displayed on the content display device 106. For example, the magnified region may cover the region of the display screen that previously displayed the expanded programming guide.

Further, in some implementations, the expanded programming guide is searchable. For example, the processing unit 124 may generate a search field that enables a user to enter alpha-numeric search criteria, and the processing unit 124 may query the expanded programming guide data stored in the memory unit 126 and retrieve search results matching the search criteria, and the processing unit 124 may transmit to the display unit 166 of the content display device 106, the expanded programming guide with the search results marked. The marked search results may be highlighted within the grid of the expanded programming guide. In cases where the expanded programming guide is large and the programming information within the region is small or not shown, an individual search result may not be perceptible due to the small blocks within the grid. In this case, regions corresponding to a segment of time and channel(s) containing the search result or results may be marked. When the marked region is selected, the region of the expanded programming guide may be magnified and may show another view of the expanded programming guide including content-related information such as programming information with the corresponding search result(s) channel and timeframe marked. For example, selecting a marked region may cause the content receiver to zoom into an area including region to generate another view of the expanded programming guide or may generate an expanded programming guide by generating a magnified region provided as an overlay. Certain views of the expanded programming guide shows a grid with cells that are sized and shaped to display content-related information including text and other details related to the programming events in a way that is perceptible (such as readable or understandable) by the user) and the cells with the programming events corresponding to the search result(s) may be marked.

FIG. 2 illustrates a method 200 for providing an expanded programming guide utilizing a content receiver. The method 200 may be performed by the system 100 of FIG. 1. The flow begins at block 201 and proceeds to block 202 where a traditionally sized programming guide may optionally be transmitted by the content receiver 102 to the content display device 106. The flow may then proceed to block 203 where the processing unit 124 receives a command to transmit a first view of an expanded programming guide to the content display device 106 having a plurality of regions representing a range of channels for a timeframe. For example, the command may be transmitted to the processing unit 124 by the controller 108. The flow continues to block 204 where the content receiver 102 transmits the programming guide to the content display device 106. The flow optionally proceeds to block 205 where the processing unit 124 determines whether or not the programming guide is to be resized (such as magnified or expanded). If so, the flow proceeds to block 206 where the processing unit 124 transmits a resized expanded programming guide. If the programming guide is not to be resized, the flow optionally proceeds to block 207 where the processing unit 124 determines whether or not a region of the programming guide has been selected (such as by a user selecting a button or series of buttons on the controller 108). If not, the flow returns to block 204 where the processing unit 124 continues to transmit the first view of the expanded programming guide. If a region of the expanded programming guide has been selected, the flow proceeds to block 208 where the processing unit 124 transmits another view of the expanded programming guide (such as a magnified view of the region of the programming guide) to the content display device 106. The magnified view of the region may be provided as an overlay with the expanded programming guide in the background, described below.

The flow then proceeds to block 209 where the processing unit 124 optionally determines whether or not a selection has been made within the region. If not, the flow returns to block 208 where the magnified view of the region is displayed on the content display device 106. If a selection has been made, the flow then proceeds to block 210 where the processing unit 124 takes action in response to the selection. For example, the action taken may be to switch the channel transmitted to the content display device 106, to provide instructions to record a programming selection, to provide additional details related to the programming event selection, and so on. In another example in response to selecting a region, the processing unit 124 may exit from the expanded programming guide and transmit a traditionally sized programming guide corresponding to the region, portion thereof, or the region as well as neighboring regions.

The flow then proceeds to block 211 where the processing unit 124 optionally determines whether search criteria has been entered. If search criteria has not been entered, the flow returns to block 204 where the content receiver 102 transmits the expanded programming guide to the content display device 106. If search criteria has been entered, the flow proceeds to block 212 where the processing unit 124 queries the programming information stored in the data storage unit 126 and retrieves search results matching the search criteria entered. The flow then proceeds to block 213 where the processing unit 124 transmits the expanded programming guide with the search results marked.

The flow then proceeds to block 214 where the processing unit 124 determines whether a selection (such as a selection based on the search results or otherwise) has been entered. If a selection has not been entered, the flow returns to block 213 where the marked search results are displayed on the expanded programming guide. If a selection has been entered, the flow proceeds to block 215 where the processing unit 124 takes action in response to the selection. For example, the action taken may be to navigate to one or more of the marked search results or other programs proximate to the search results, to transmit a resized expanded programming guide (e.g., the flow may return to block 206), to transmit a magnified view of the search results (e.g., the flow may return to block 208), to view programming details of the marked search results or other programs, record one or more of the marked search results or other programs, and so on.

The flow may then proceed to block 214 where the processing unit 124 exits or stops the transmission of the expanded programming guide. For example, upon exiting the programming guide, video content may be viewed on the full screen of the content display device or a traditionally sized programming guide may be transmitted to the content display device.

Figure 3A:
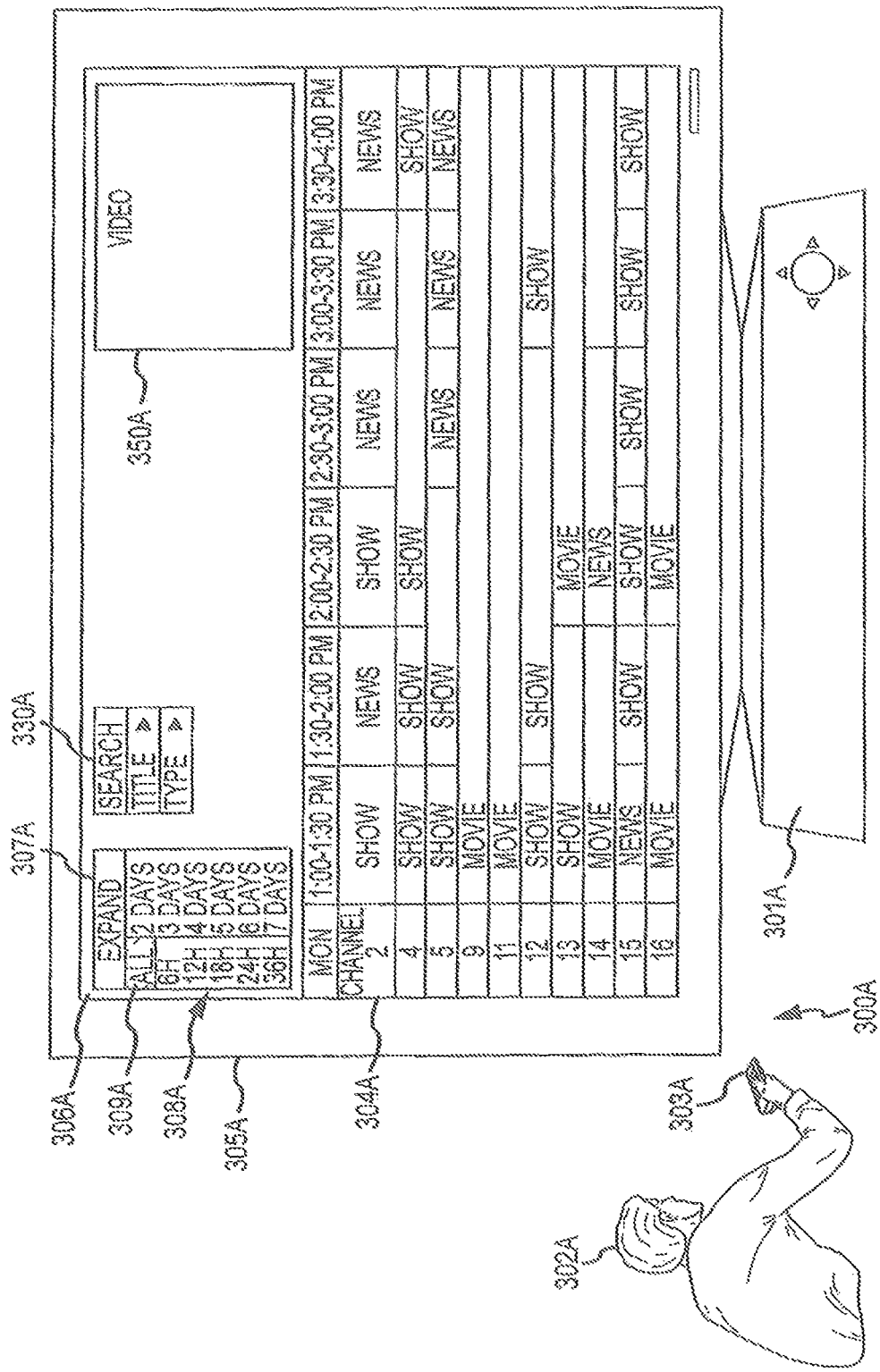

FIGS. 3A-3J illustrate a system 300A-300J for providing an expanded programming guide utilizing a content receiver 301A-301J. The user 302A utilizes a controller 303A to make selections related to the expanded programming guide. For example, when viewing a traditionally sized programming guide 304A displayed by the content display unit 305A on the display screen 306A, the user may enter selections for the expanded programming guide utilizing the expand menu 307A displayed on the display screen 306A. The user 302A may navigate through the various options 308A (such as All, 6 hours, 12 hours, 18 hours, 24 hours, 36 hours, 2 days, 3 days, 4 days, 5 days, 6 days, 7 days, and so on) of the expand menu 307A utilizing the controller 303A and select the manner in which the programming guide is to be displayed. In FIG. 3A, the user 301A selects the "All" option 309A from the expand menu 307A.

Figure 3B:
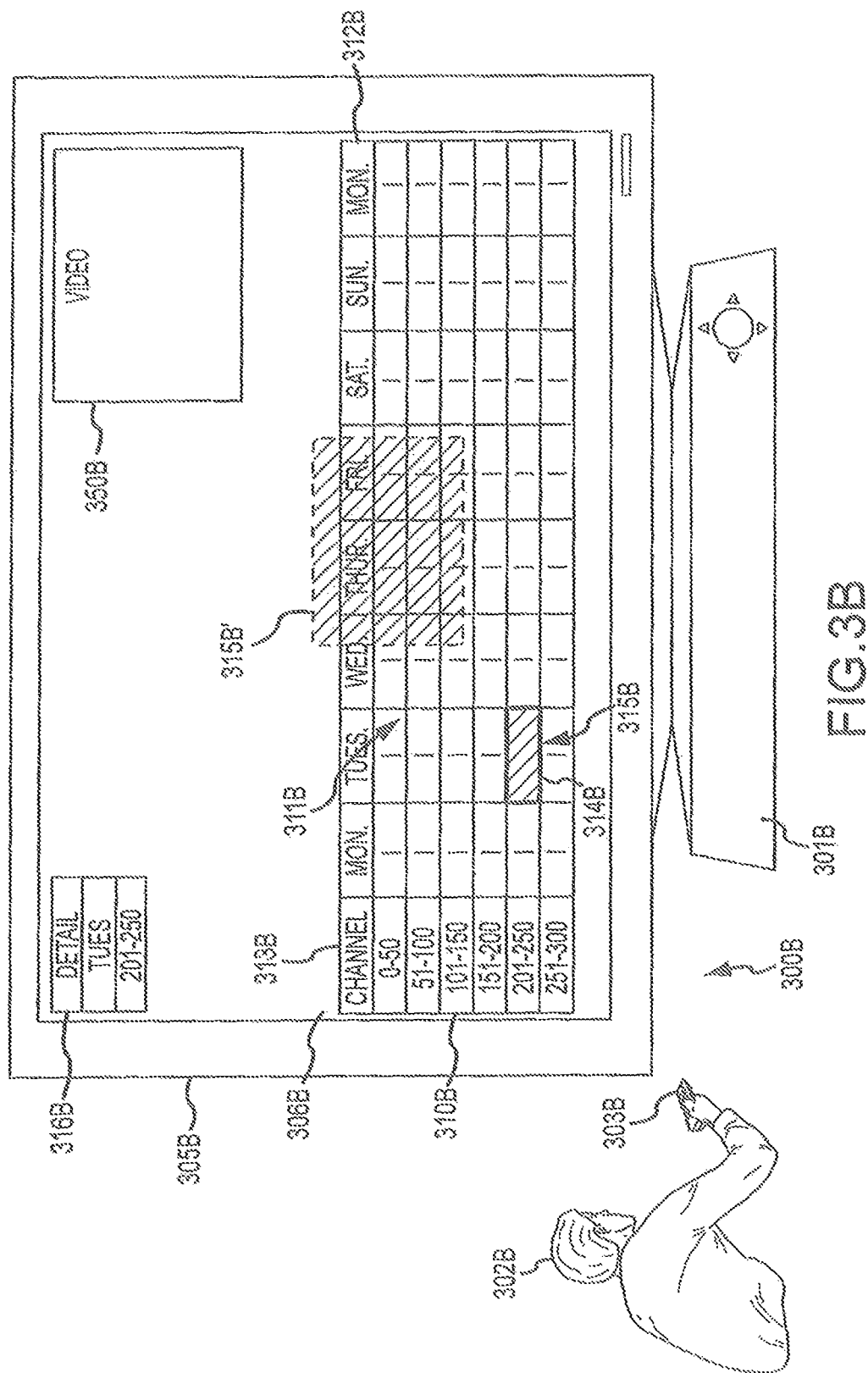

Turning to FIG. 3B, in response to selecting the "All" option 309A, the content receiver 301B transmits the expanded programming guide 310B for all programming guide information available in the data storage unit of the content receiver 301B. In FIG. 3B, the expanded programming guide 310B displays a grid 311B formed of regions defined by the time and date axis 312B (x-axis) and the channel axis 313B (y-axis) and corresponds to 8 days of programming information for channels 0-300. It will be appreciated that the expanded programming guide 310B displaying "All" programming guide information may include more or less information than shown in FIG. 3B depending on the information available in the data storage unit. In addition, it will be appreciated that the expanded programming guide 310B may be displayed on the display unit 305B in response to any selection, and is not limited to utilizing the expand menu 307A. For example, the user 302B may utilize the controller 303B or another selection mechanism to resize the expanded programming guide. For the expanded programming guide showing "All" programming guide information, a resized expanded programming guide may be magnified so that another view of the expanded programming guide shows a subset or a portion of the previously displayed expanded programming guide. For example, compared to the expanded programming guide 310B in FIG. 3B, the view of the expanded programming guide 310I in FIG. 3I includes time and channel range information for less time, approximately 2 days of programming, but over 300 the same channel range. Thus, the regions within the expanded programming guide 310I correspond to a shorter timeframe, e.g., a 6-hour timeframe. As in FIG. 3B, the regions and therefore the channel axis 313I in FIG. 3I, correspond to 50 channels. It will be appreciated that the expanded programming guide may be displayed with successive views each with different timeframes and/or channel ranges, described further below. In addition, the configuration of the successive expanded programming guides may be based on user preferences, on available channels, on predefined settings stored in the memory unit 126, and so on.

Returning to FIG. 3B, utilizing the controller 303B, the user 302B navigates the cursor 314B to a region 315B within the expanded programming guide 310B, and in FIG. 3B, the region 315B corresponds to Tuesday, at channels 201-250. It will be appreciated that the cursor 314B may navigate to a portion of the expanded programming guide that is larger or smaller than the region 315B, described below. In some implementations, the user 302B may confirm the cursor 314B overlays the correct region or portion by viewing the detail window 316B that shows the day and channels within the cursor 314B. The user 302B may select to view the programming event information for the channels and timeframe corresponding to the region 315B by utilizing the controller 303B.

Figure 3C:
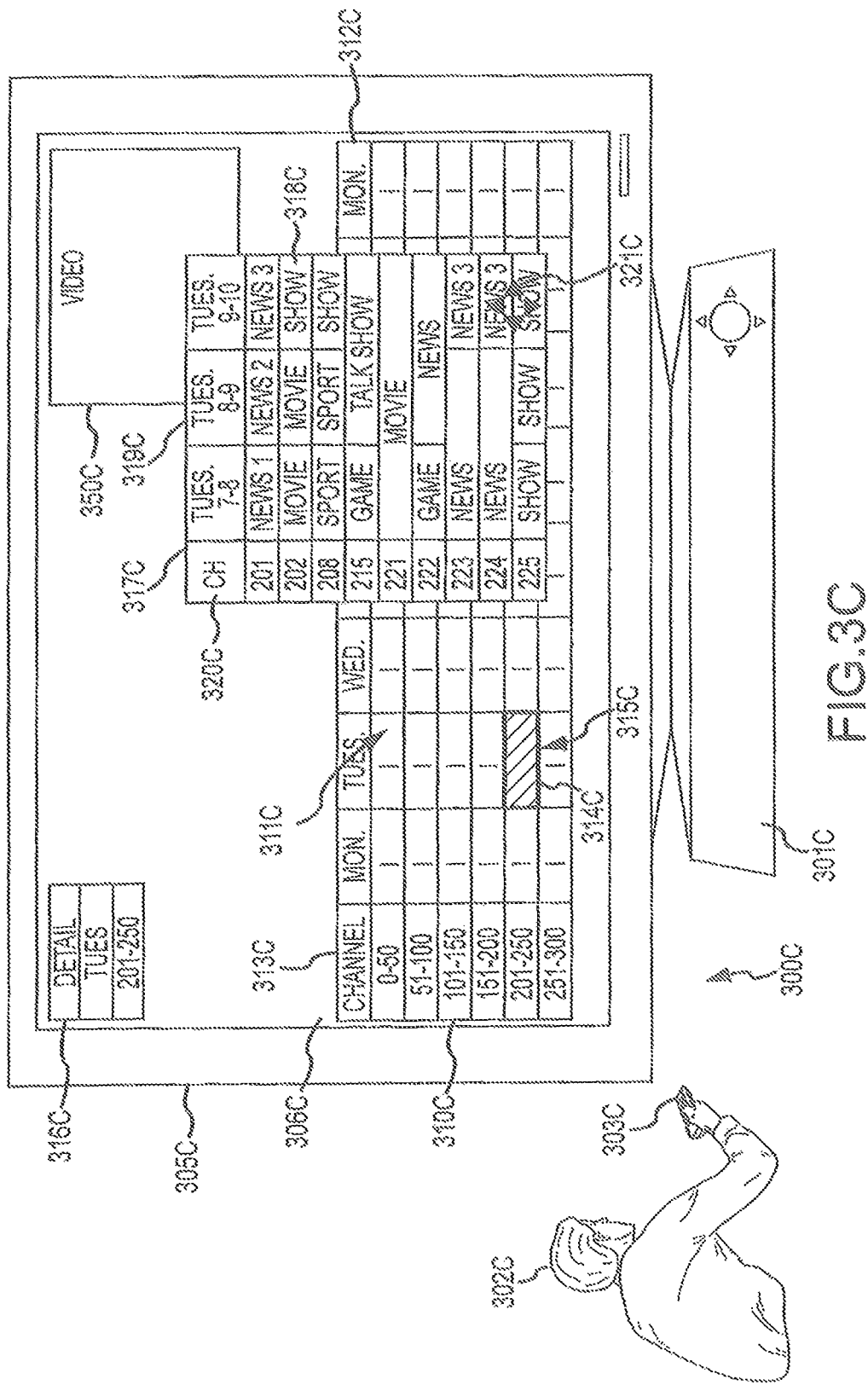

Turning to FIG. 3C, in response to the user selection of the region 315C, the processing unit 124 transmits another view of the expanded programming guide provided as a magnified view 317C of the channels and a time range within the region 315C. The configuration of the magnified view 317C of the region 315C may be based on user preferences, on available channels within the region, on predefined settings stored in the memory unit 126, and so on. For example, the user 302C may enter selections into the memory unit 126 about channels for which the user prefers to view programming information, and the magnified view 317C may display the programming information based on the user preferences. In another example, the user 302C may subscribe to only a subset of channels within a given region, and the magnified view 317C displays only the subset of channels available to the user. In another example, the processing unit 124 executes instructions stored in the memory unit 126 to display a magnified view based on predefined settings (such as settings originating from the content provider 104). Consistent with any or all of the preceding examples, in FIG. 3C, the magnified view 317C provides programming event information 318C for channels within the range of 200 to 250, but not for every channel within the range. The magnified view 317C shows a detailed grid of programming event information for a segment of time 319C within the timeframe associated with the region and the channels 320C within the region. In some implementations, the user 302C may navigate within the magnified view 317C to display programming information 318C for different times and channels within the region 315C by utilizing the icons 321C displayed within the magnified view 317C and/or by utilizing the controller 303C. In some implementations, the user 303C may navigate within the magnified view 317C to another region, and while not shown, the cursor 314C may move to the corresponding region within the expanded programming guide 310C (or portion thereof) and the detail window 316C may show information about the region or portion. In addition, the user may enter selections within the magnified region to cause the processing unit 124 to take an action, such as change the channel, record a program from the programming information 318C displayed, view details related to the programming event such as synopsis, rating, actors, and other programming information.

Figure 3D:
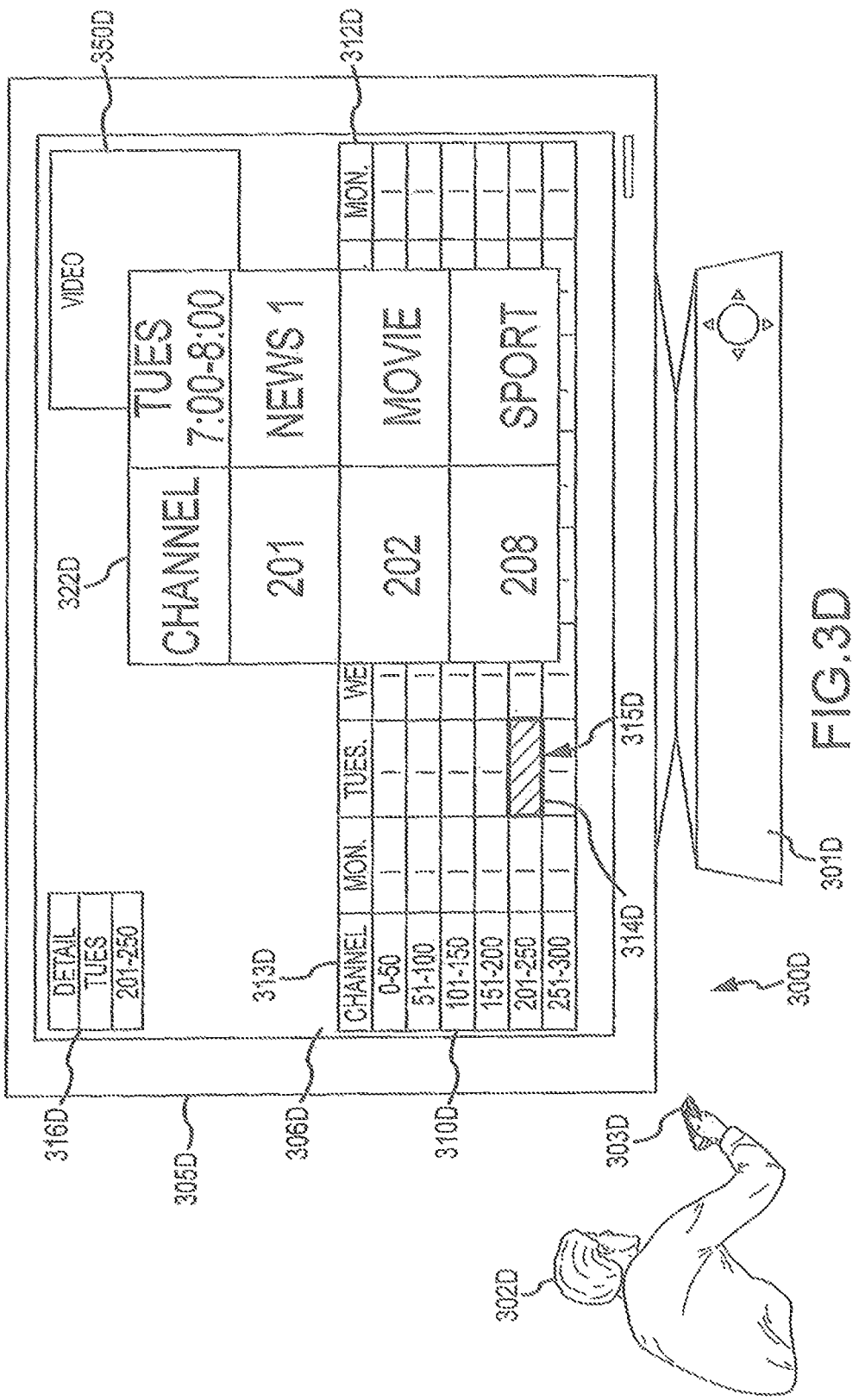

Turning to FIG. 3D, in some implementations, a further magnification of the magnified view 317C may be provided by the amplified view 322D of the region 315D. The amplified view 322D may show larger text identifying channels, times and programming information for the region 315D. In FIG. 3D, the amplified view 322D is about the same size as the magnified view 317C, but includes less information (such as channel and time ranges and programming information) due to the relatively larger or amplified text displayed. In some implementations, the boundaries of the amplified view 322D may be relatively larger or smaller than the boundaries of the magnified view 317C. The amplified view 322D may be useful for vision-impaired users, for example, in order to enable those with compromised eyesight to read or perceive a portion of the programming information for the region.

Figure 3E:
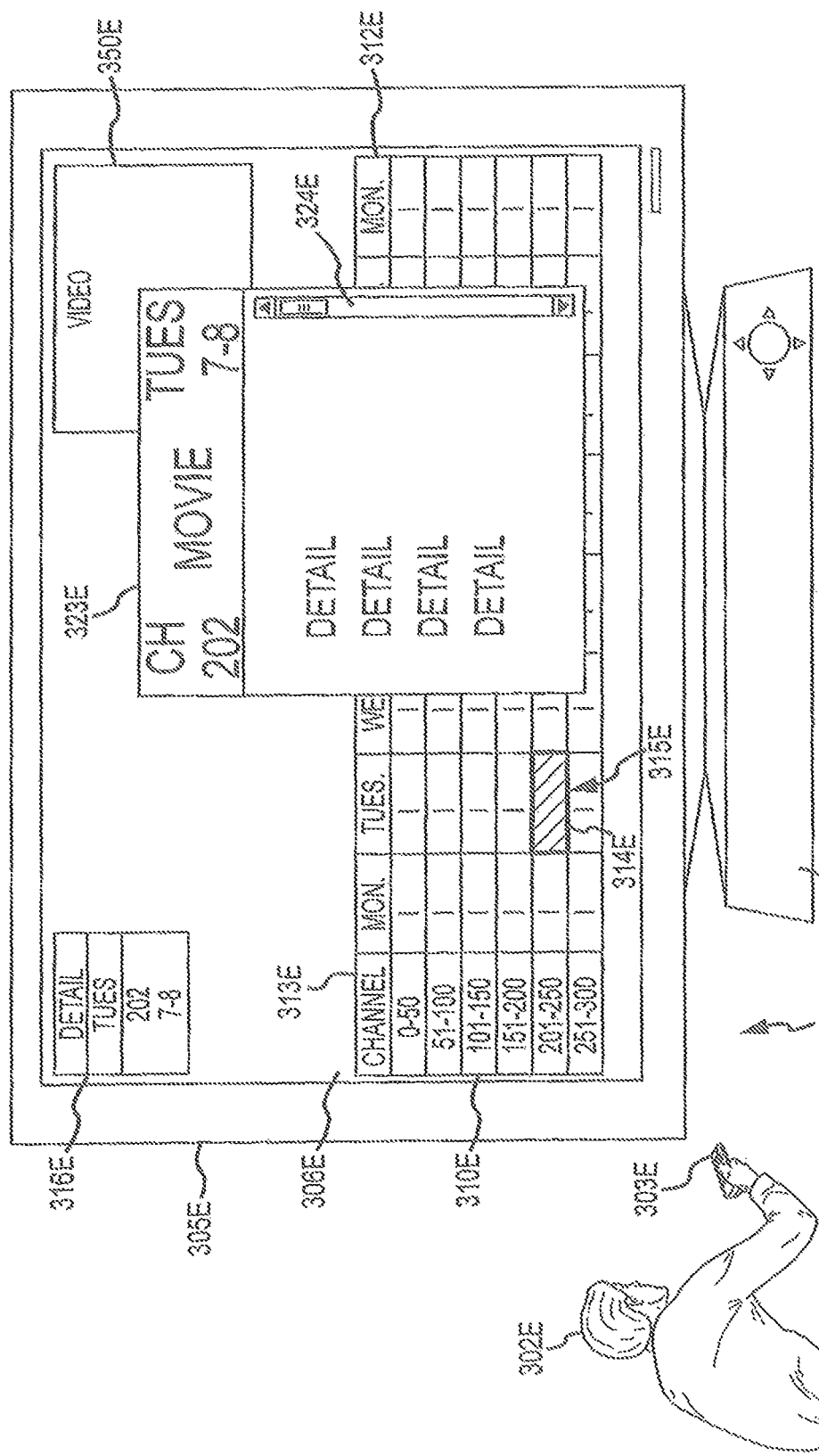

Turning to FIG. 3E, in some implementations, programming event information may be displayed by the detailed view 323E. The detailed view 323E may show details for one or more of the programs listed within the magnified view 317C. In FIG. 3E, the detailed view 323E shows programming information details about the movie on channel 202 showing from 7-8 on Tuesday. The user 302E may scroll through the information shown in the detailed view 323E utilizing icons such as a scroll bar 324E. In some implementations, the information within the detail window 316E may show some information related to the detailed view 323E, or may show information related to the region from which the detailed view 323E is derived (see e.g., detail window 316D in FIG. 3D).

Figure 3F:
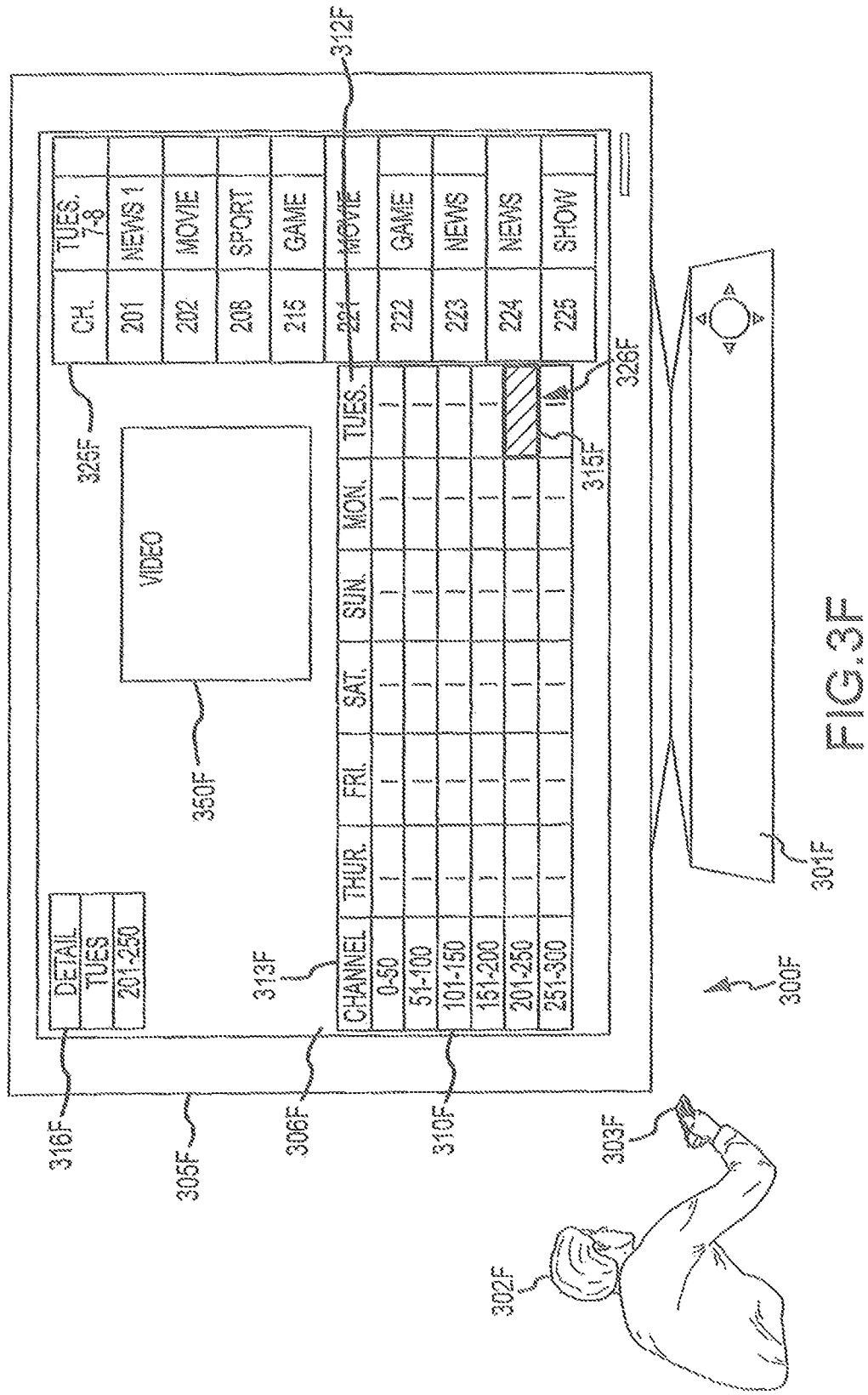

Turning to FIG. 3F, in some implementations, a static magnified view 325F of a region of the expanded programming guide 310F may be displayed on the display screen 306F. For example, rather than utilizing a cursor 314B to navigate through the expanded programming guide 310F, the entire expanded programming guide 310F may be shifted across the display screen, and upon moving a region 315F of the expanded programming guide 310F to an active block 326F, the static magnified view 325F may display details of the region 315F. In FIG. 3F, programming information for channels within the 200-250 channel range are shown for the 7:00-8:00 timeframe within the static magnified view 325F. It will be appreciated that more or less programming information for various timeframes may be shown in the static magnified view 325F. In addition, the static magnified view 325F may be positioned at any location in the viewable region of the display screen 306F.

While FIG. 3F shows programming information for several channels within the region 315F for a 1 hour timeframe, FIG. 3G shows a magnified view of programming information for a longer timeframe but for a single channel in the magnified channel view 327G. For example, a horizontal cursor 328G may be moved about the expanded programming guide 310G, and in response, the magnified channel view 327G may show programming details for one or more channels for an extended period of time. In FIG. 3G, the cursor 328G overlies a region corresponding to channel 202, and the magnified channel view 327G shows programming information for channel 202 for an 18 hour timeframe (Tuesday 10 am to Wednesday 3 am). In some implementations, the user 302G may navigate within the magnified channel view 327G to display programming information for different times and/or channels by utilizing the icons 329G displayed within the magnified channel view 327G and/or by utilizing the controller 303G. In some implementations, the information within the detail window 316G may show information related to the magnified channel view 327G (such as channel, beginning time and timeframe), or may show information related to the region 315G from which the magnified channel view 327G is derived (see e.g., detail window 316D in FIG. 3D).

Figure 3H:
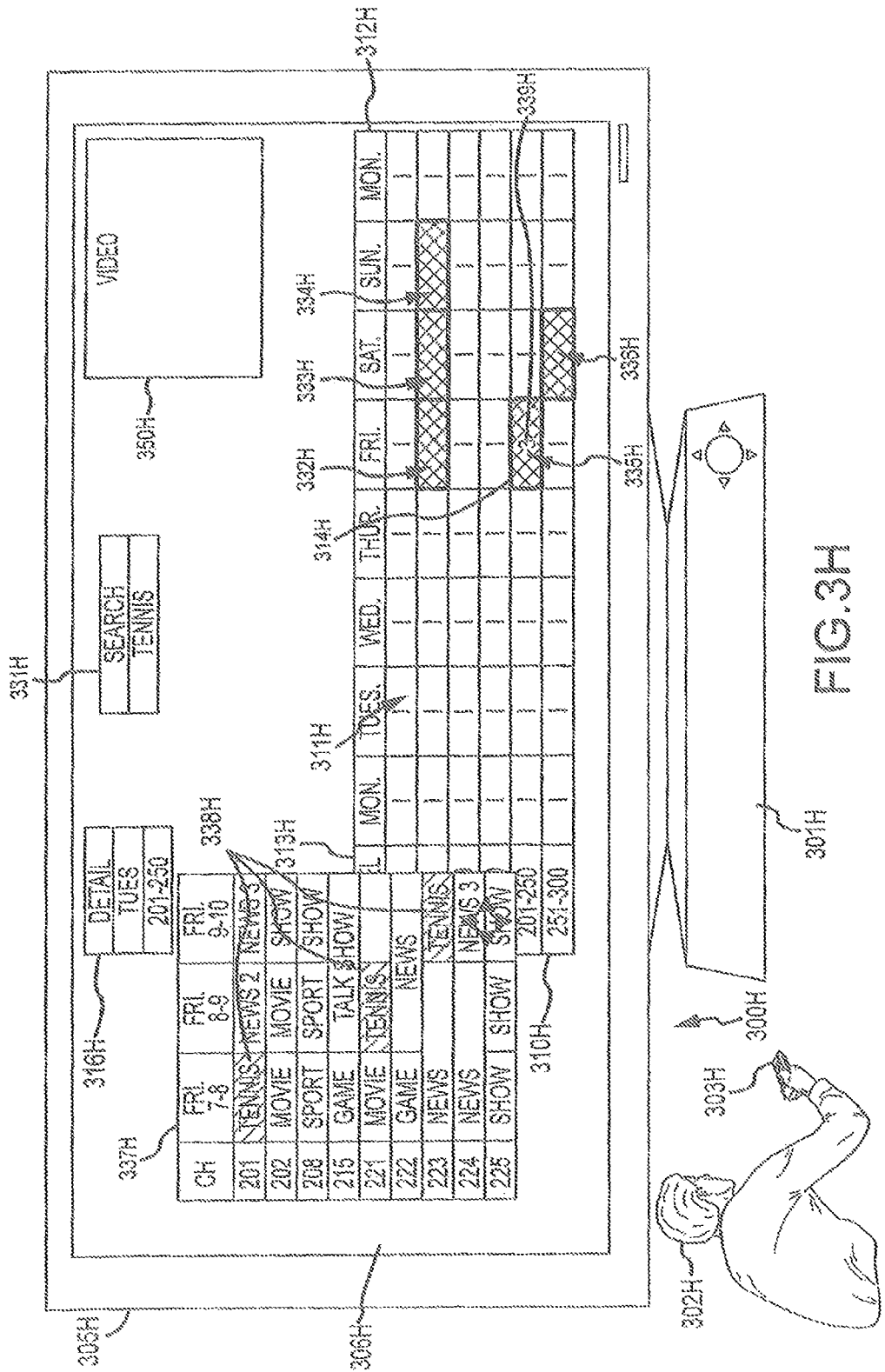
Figure 31:
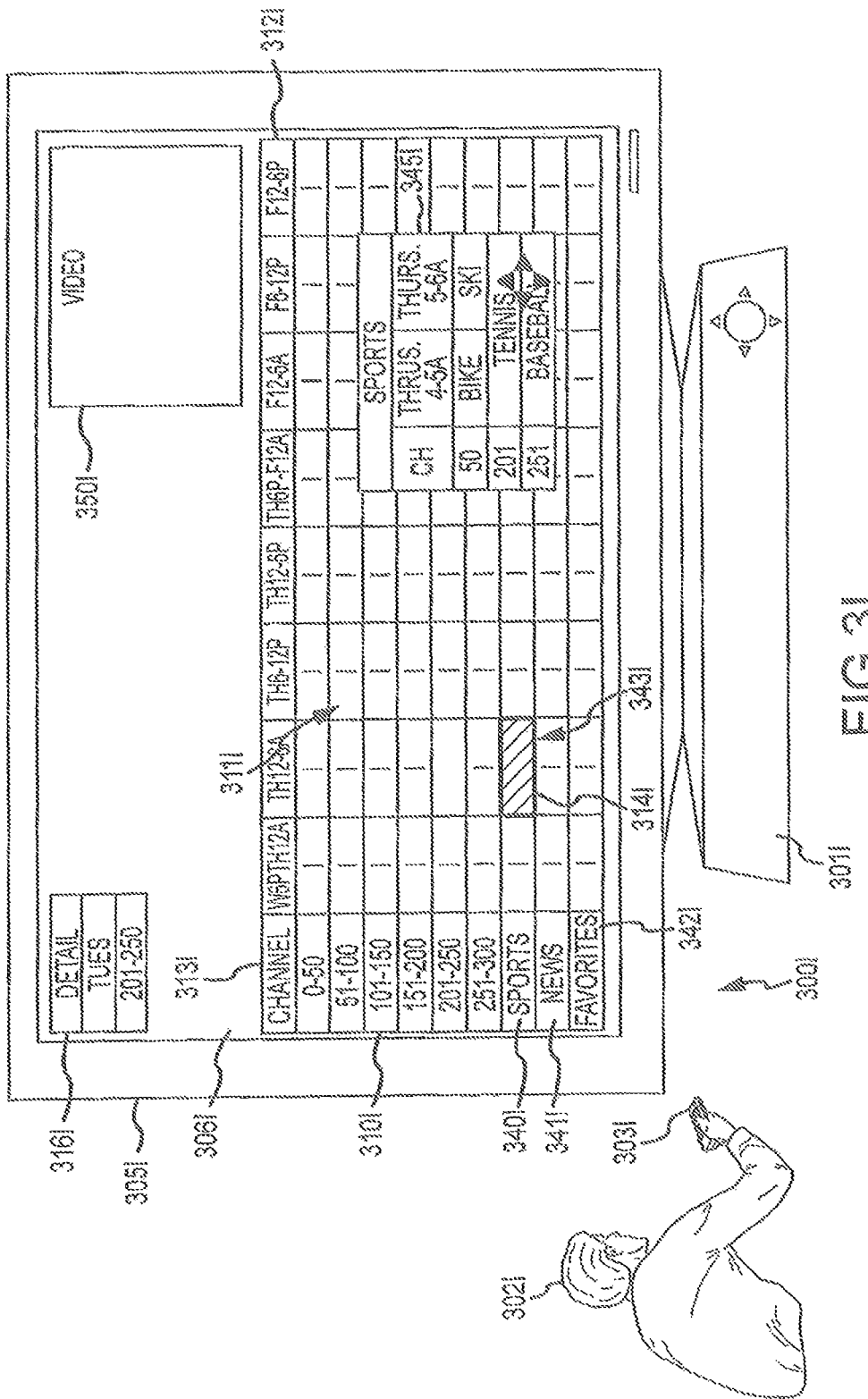

Returning to FIG. 3A, the content receiver 301A may transmit a search widget 330A to the display unit 306A to enable the user 302A to enter search criteria for searching for a show title or a type of show. Turning to FIG. 3H, upon selecting the search widget 330A to search a type of program, the user may enter search criteria in a search field 331H. In response to performing the search, the processing unit transmits the expanded programming guide 310H to the display unit 306H of the content display device 305H with marked portions showing areas of the expanded programming guide 310H containing information matching the search criteria. In FIG. 3H, marked regions 332H-336H within the expanded programming guide 310H show regions with information matching the "tennis" search criteria entered in the search field 331I. Utilizing the cursor 314H, the user may navigate to the marked region to view the search results, such as to marked region 335H in FIG. 3H, and view a magnified view 337H of the marked region 335H. The magnified view 337H may include marked programming events that match the search results, and in FIG. 3I, three programming events are marked 338H that match the search. In addition, some regions with matching search results may be partially marked on the expanded programming guide, and regions associated with multiple channels and times matching the search results may show additional markings (e.g., the region may be more fully marked or may be shaded with a different color compared to regions with less channels/times matching the search) on the expanded programming guide. In addition or alternatively, the number of search result matches for each region may be displayed within the region. For example, in FIG. 3I, the marked region 335H displays the number of matches 339H the region contains, which for region 335H is three (3) matches. This may enable the user to navigate to the regions of the expanded programming guide knowing the approximate or exact number of search results associated with a region.

The grid format of the expanded programming guide may be dynamically configured, for example, utilizing the menu 307A to select a timeframe for the grid to display. In addition, the channel ranges for the grid and/or for each region may be dynamically configured. As discussed above, while the channel ranges associated with the channel axis 313B-313J y-axis may show a specified range of channels, the actual channels displayed within the magnified view of the region may be different, for example, based on subscribed channels, available channels, user preferences, and so on. In some implementations, the channels associated with the y-axis may also be dynamically configured. For example, the user may select the range of channels associated with each region, and each range of channels may be the same (e.g., 25 channels per region) or may differ from region-to-region. In some implementations, the range of channels and timeframe associated with the regions dynamically change in response to a magnification and/or an expansion operation of the expanded programming guide, described below.

Furthermore, in some implementations, the regions may be dynamically configured according to channel type. For example, while multiple sports channels may be available to the user, the channels may be interspersed across a number of regions associated with consecutive channel ranges. FIG. 3I shows an implementation in which the expanded programming 310I dynamically configures a region of associated channels by the type or category of programming transmitted. In this implementation, the content receiver 301I and/or the user 303I, may dynamically configure the expanded programming guide 310I to group the plurality of channels within the region by category (such as sports, news, local channels, education, favorites, and so on). The regions on the grid of the expanded programming guide 310I may be bounded by their respective category (such as by category type or utilizing a custom title for the region) and timeframe. In FIG. 3I, the channel axis 313I includes categories corresponding to sports 340I, news 341I and favorites 342I. The user may navigate the cursor 314I to one or more of the regions for the categories, and select to magnify the region. In FIG. 3I, the magnified category region 345I includes channels 50, 201 and 251 with sports programming Grouping channels by the type or category of programming associated therewith enables the user to view programming information for channels that otherwise may be in separate regions. For example, in the magnified category region 345I, the sports channels 50, 201 and 251 would typically be in separate regions but for their common sports category.

Figure 3J:
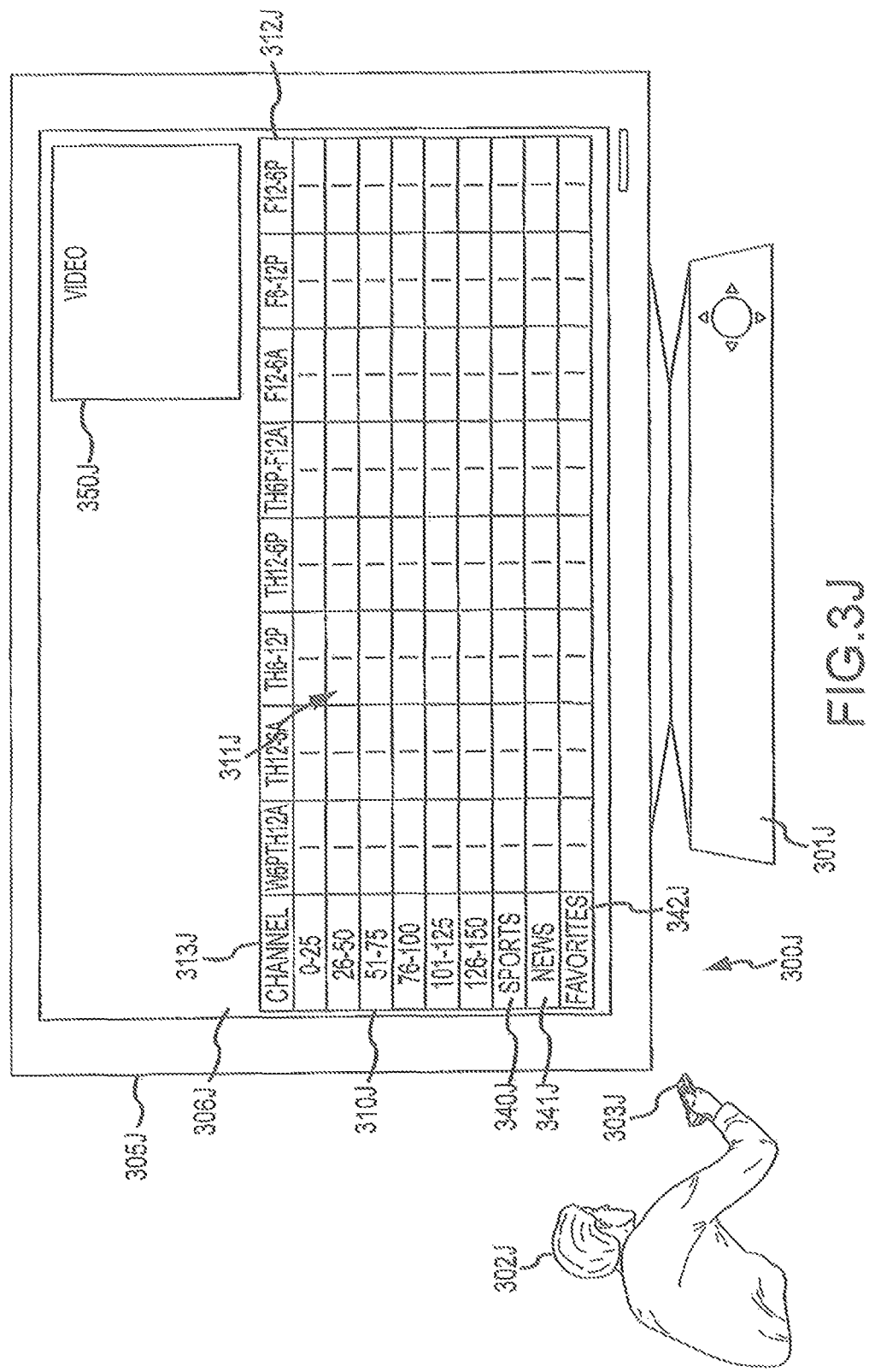

While the expanded programming guide 310B-310J is shown as having a grid format arranged at the bottom of the display screen 306B-306J the arrangement of the expanded programming guide 310B-310J may be transmitted by the content receiver 301A-301J to other positions within the display screen 306B-306J. The grid format may include a number of horizontal and vertical lines indicating borders between regions of the expanded programming guide 310B-310J. While the horizontal lines form a border for a region of 50 channels, the horizontal lines may form borders for more or less channels. While the vertical lines form a border for a region of 1 day in FIGS. 3B-3H, the vertical lines may form borders for more or less time such as 6 hours shown in FIG. 3I. The areas within the border lines forming regions (e.g., a region corresponding to 1 day and 50 channels in FIGS. 315B-315H) may additionally include border markings, such as lines. For example, in FIGS. 3B-3J, a vertical line within each region marks a mid-point corresponding to 12 hours within the region 315B-315J. Because the regions 315B-315J displayed on the non-magnified portion of the expanded programming guide 310B-310J generally correspond to larger blocks of time or channels compared to traditionally sized programming guides, the regions 315B-315J may be sized to give general indications to the user of the general date, time and channel range associated with a given area. However, specific details for a programming event for a given channel may not be viewed on the expanded programming guide 310B-310J itself, and according to implementations provided herein, the magnified regions of the expanded programming guide 310B-310J provide details for programming events As discussed above, the view of the expanded programming guide may be iteratively changed to enable the expanded programming guide to be magnified (e.g., zoomed in) or expanded (e.g., zoomed out). In some implementations, magnifying the expanded programming guide provides a view with a changed timeframe but for the same channel range such as shown in FIG. 3B in comparison to FIG. 3I. In FIG. 3I, the timeframe for the expanded programming guide 310I spans approximately 2 days, whereas the timeframe for the expanded programming guide 310B in FIG. 3B spans 8 days. In other implementations, magnifying the expanded programming guide shows a view with a changed timeframe and a different channel range, such as shown FIG. 3B in comparison to FIG. 3J. In FIG. 3J, expanded programming guide 310J spans approximately 2 days (e.g., along the time and date axis 312J (x-axis)) for 150 channels (e.g., along the channel axis 313J (y-axis), and the channel ranges on the channel axis 313J correspond to 25 channels, which is in contrast to the channel ranges on the channel axis 313B of FIG. 3B, which corresponds to 50 channels. Furthermore, depending on the detail to which the expanded programming guide is magnified, the regions within the expanded programming guide may show programming information. For example, the expanded programming guide may show the same amount of programming information as shown and described in connection with the magnified regions or as shown and described in connection with the traditional programming guide. Where the expanded programming guide is magnified to a degree in which the a particular channel is displayed or programming information is shown, the user may enter selections (such as changing the channel, recording a programming event, viewing additional detail, and so on). Thus, in some implementations, the user may view the same information on the magnified expanded programming guide as described in connection with the magnified regions, and so instead of providing the magnified region as an overlay, the expanded programming guide 310B-310J shows this information. Accordingly, the expanded programming guide 310B-310J itself may display the same programming information as shown in the magnified view 317C, the amplified view 322D, the detailed view 323E, the magnified channel view 327H, and/or the magnified category region 345I.

The expanded programming guide may be magnified or expanded linearly so that the view of the content within the expanded programming guide continuously changes size until a desired view of the expanded programming guide is shown. For example, the user may utilize the controller 303A-303J to select to zoom in or zoom out from the expanded programming guide, and the expanded programming guide shown on the display screen may continuously change size, or may retain the same size while the size and/or detail of time, channel and/or programming information contained therein continuously changes size and/or detail until the user decides the desired view is achieved. For example, as the expanded programming guide is continuously magnified, the regions shown may continuously increase in number and may show fewer channels and/or timeframes associated therewith until each region corresponds to a single channel over a short timeframe, such as 0.5 hours. Continued magnification of a region may result in showing a detailed view containing information shown in the detailed view 323E in FIG. 3E but within the expanded programming guide itself. In addition or alternatively, the expanded programming guide may be magnified or expanded iteratively in a stepwise manner, such as shown in FIGS. 3B to 3I and FIGS. 3B to 3J. The level of detail shown in the linear or iterative magnification of the expanded programming guide may be the same or similar to the same programming information as shown in the magnified view 317C, the amplified view 322D, the detailed view 323E, and/or the magnified channel view 327H.

In some implementations, within the expanded programming guide, the content receiver 301A-301J may perform operations to further magnify or amplify the information contained therein or may alternatively perform a reduction operation in which information within the expanded programming guide is reduced in size or the size. For example, within a region of the expanded programming guide, instead of transmitting a magnified region described above, the text (e.g., channel, time, program event title) associated with the region may be magnified or amplified. This may be useful for vision-impaired users, for example, in order to enable those with compromised eyesight to read or perceive a portion of the programming information within the region of the expanded programming guide. It will be appreciated that the size of the text and/or the size of the region may be adjusted multiple times to enable the user to view programming information at a desired size and detail.

The expanded programming guide and the magnification and expansion operations associated therewith may be based on user preferences, on zooming selections, on default setting, and so on. It will be appreciated that the expanded programming guide may be displayed on the content display device alone or in combination with magnified regions.

In some implementations, the content receiver 301A-301J is configured to enable navigation through the expanded programming guide 310B-310J utilizing a controller 303A-303J that moves a cursor (such as cursor 315B). Returning to FIG. 3B, the user 302B may quickly move the cursor 315B about the expanded programming guide 310B, enter a selection to view a magnified region (such as magnified view 317C) and may exit out of the magnified region to view the full expanded programming guide 310B. The user 302B may continue navigating through the expanded programming guide 310B and select another region for magnification. Furthermore, the user may utilize the cursor 315B to move to different portions of the expanded programming guide and successively zoom in or zoom out (e.g., iteratively or linearly) from where the cursor 315B is arranged. This may enable the cursor 315B to serve as an aid for centering the portion of the expanded programming guide to be magnified or expanded. When the expanded programming guide is magnified to a degree in which the programming information is shown on the expanded programming guide, the user may enter selections in the manner described above.

The cursor may be dynamically modifiable in order to enable the cursor to be utilized for entering various types of selections in connection with the expanded programming guide or the magnified regions. For example, instead of a configuration for overlaying a region, the cursor may be configured to overlay the entire expanded programming guide, a plurality of regions, a portion of a region, and so on. Thus, when used as a centering aid, the cursor may magnify or expand a portion of the expanded programming guide, which may be larger or smaller than a region. Returning to FIG. 3B, the cursor 315B' may encompasses the portion of the expanded programming guide 310B corresponding to Wednesday 6 PM to Friday 6 PM for channels 0-150. Accordingly, in FIG. 3J, the expanded programming guide 310J corresponds to the portion of the expanded programming guide 310B within the cursor 315B'. It will be appreciated that the size of the cursor may not necessarily correspond to the subsequently resized expanded programming guide, and instead any sized cursor may be used in connection with the controller 303A-303J to achieve the desired view of the expanded programming guide. For example, the user may enter selections on the controller 303A-303J to expand or magnify the expanded programming guide (e.g., linearly or stepwise). In addition, the cursor may be movable anywhere within the display screen, similar to a mouse pointer, to enable the user to quickly navigate to any portion of the on screen display content.

As discussed above, selections may be entered within the expanded programming guide 310B-310J (such as to select a region for magnification or expansion or to select to expand or magnify the expanded programming guide). In further implementations, marked search results displayed on the expanded programming guide may enable the programming events associated therewith to be selected and/or recorded from the expanded programming guide itself instead of from within a magnified region. For example, in FIG. 3I, while programming details are not shown for region 335H, the search results show that three (3) programming events associated with the region are matches 339H for the search criteria. In this case, the user may select to record the three programming events without further magnifying the expanded programming guide or displaying a magnified region.

When the expanded programming guide is shown with a magnified region (e.g., as an overlay to the expanded programming guide), the different variations of the magnified region such as the magnified view 317C, the amplified view 322D, the detailed view 323E, the magnified channel view 327H, and/or the magnified category region 345I may be stored in memory and may be displayed on the display screen 306A-306J based on user preferences, on zooming selections, on default setting, and so on. The magnified regions may be static or movable. For example, a static magnified region (such as the static magnified view 325G) may enable the user 301A-301J to view the same portion of the display screen 306A-306J while utilizing the controller 108 to move the expanded programming guide side-to-side, up-and-down, diagonally, and so on, until the region of the programming guide of interest underlies the magnified region. A movable magnified region may enable the user to move the magnified region about the display unit 166 until centered over a region to be magnified. In some implementations, a cursor, such as cursor 314B, may be moved to a region 315B, and upon selection, the movable magnified region may be transmitted as an overlay adjacent to the cursor as in FIG. 3C. In some implementations, the movable magnified region may move dynamically in response to movement of the cursor from side to side or up and down to enable the user to view the cursor and the magnified region simultaneously Magnified regions may have a predefined shape (such as shaped with border lines defining a square, rectangular, circular, or oval shape) and/or may have a predefined (such as a predefined width and height across the expanded programming guide 310B-310J, the display screen 306A-306J). Alternatively, the size and shape of the magnifying pane may be selected by the user. The magnified regions generally overlay the underlying expanded programming guide 310B-310J so that both the magnified region and the expanded programming guide 310B-310J may be viewed simultaneously.

In some implementations, the magnified regions may display programming information at a first size, and then at another size different from the first size. For example, FIG. 3C shows the magnified view 317C with text displayed at a first size, and FIG. 3D shows the amplified view 322D with text displayed at a second size that is larger than the text shown in the magnified view. In this case, amplification involves showing only a portion of the region selected the same-sized magnifying pane but in a larger text. In another example, when the magnifying pane magnifies a region of the expanded programming guide 310B-310J, the information therein may be further magnified so that the overall size of the magnified region is larger (as opposed to the text size). In this case, further magnification may involve enhancing the size of the magnifying pane (such as doubling, tripling or quadrupling the size). In a further implementation, a magnified region may be sized differently from another magnified region by changing the size of the region the text size. It will be appreciated that the size of the text and the size of the magnified regions may be adjusted multiple times to enable the user to view programming information at a desired size and detail. Within the magnification regions, the content receiver may perform operations to further magnify or amplify the information contained therein or the size of the region (e.g., zoomed in). The content receiver may alternatively perform a reduction operation in which information within the magnified region is reduced in size or the size of the magnified region is reduced (e.g., zoomed out).

In some implementations, the video region 350A-350J may display a programming event the user 302A-302J desires to watch while browsing the traditional or expanded programming guide.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for utilizing a content receiver to provide an expanded programming guide, the method comprising:

generating a programming guide comprising a grid of a plurality of regions defined by a first plurality of columns and a first plurality of rows, each column of the first plurality of columns associated with a timeframe, each row of the first plurality of rows associated with a plurality of channels, each region being defined by an intersection of a single column of the first plurality of columns and a single row of the first plurality of rows;

configuring, by the content receiver, the grid to display a first view of the plurality of regions;

receiving a search request for a television program;

marking in a first manner each region of the plurality of regions that comprises, during its respective timeframe and on a first number of its respective plurality of channels, television programs that match the search request, while not displaying any information regarding the television program that matches the search request within the regions marked in the first manner;

marking in a second manner each region of the plurality of regions that comprises, during its respective timeframe and on a second number of its respective plurality of channels, television programs that match the search request, while not displaying any information regarding the television program that matches the search request within the regions marked in the second manner, wherein the second number is greater than the first number, and wherein the second manner is visually different from the first manner;

receiving a selection of one of the marked regions;

in response to receiving the selection, generating an expanded display of the selected one of the plurality of regions relative to the remainder of the plurality of regions, thereby creating an expanded programming guide having a number of cells defined by a second plurality of columns and a second plurality of rows, each column of the second plurality of columns associated with a subset of the timeframe of the selected one of the plurality of regions, each row of the second plurality of rows associated with a subset of the plurality of channels of the selected one of the plurality of regions, each cell being defined by an intersection of a single column of the second plurality of columns and a single row of the second plurality of rows;

further in response to receiving the selection, populating a subset of the number of cells with content-related data for each of the plurality of channels in the expanded programming guide, wherein content-related data for at least one of the number of cells comprises information regarding the television program that matches the search request, the at least one of the number of cells being marked;

transmitting, from the content receiver, the expanded programming guide to a content display device;

receiving input for selecting a configuration of the grid of the plurality of regions; and dynamically configuring the grid of the plurality of regions to group the plurality of channels associated with each region by channel programming category.

2. The method of claim 1, wherein the expanded programming guide comprises a magnified view of the programming guide.

3. The method of claim 2, further comprising receiving a programming selection selecting the content-related data within the expanded programming guide.

4. The method of claim 1, wherein the expanded programming guide is transmitted as an overlay to the programming guide.

5. The method of claim 1 wherein the expanded programming guide is dynamically configurable to enable selection of a plurality of display types of the expanded programming guide.

6. The method of claim 1, further comprising receiving input for selecting a configuration of the grid of the plurality of regions, wherein the grid of the plurality of region is dynamically configurable to enable at least one of the plurality of channels and the timeframe associated with each region to be selected.

7. A content receiver for providing an expanded programming guide, comprising:

a processing unit configured to generate a dynamically modifiable expandable programming guide comprising a grid of a plurality of regions defined by a first plurality of columns and a first plurality of rows, each column of the first plurality of columns associated with a timeframe, each row of the first plurality of rows associated with a plurality of channels, each region being defined by an intersection of a single column of the first plurality of columns and a single row of the first plurality of rows;

a memory unit configured to store programming information for each of the plurality of channels from the expandable programming guide; and communications unit configured to transmit the expandable programming guide to a content display device and for receiving selection signals;

the processing unit operable to generate a first view of the expandable programming guide;

the communications unit operable to receive a search request for a television program;

the processing unit further operable to mark in a first manner each region of the plurality of regions that comprises, during its respective timeframe and on a first number of its respective plurality of channels, television programs that match the search request, while not displaying any information regarding the television program that matches the search request within the regions marked in the first manner;

the processing unit further operable to mark in a second manner each region of the plurality of regions that comprises, during its respective timeframe and on a second number of its respective plurality of channels, television programs that match the search request, while not displaying any information regarding the television program that matches the search request within the regions marked in the second manner, wherein the second number is greater than the first number, and wherein the second manner is visually different from the first manner;

the communications unit operative to receive a selection signal indicating the selection of a marked region;

the processing unit further operative to generate, in response to the selection signal, an expanded programming guide having a number of cells defined by a second plurality of columns and a second plurality of rows, each column of the second plurality of columns associated with a subset of the timeframe of the selected one of the plurality of regions, each row of the second plurality of rows associated with a subset of the plurality of channels of the selected one of the plurality of regions, each cell being defined by an intersection of a single column of the second plurality of columns and a single row of the second plurality of rows, wherein at least one of the number of cells comprises information regarding the television program that matches the search request, the at least one of the number of cells being marked;

the communications unit further operative to transmit the expanded guide to a display for rendering;

the communications unit further operative to receive input for selecting a configuration of the grid of the plurality of regions; and the processing unit operable to dynamically configure the grid of the plurality of regions to group the plurality of channels associated with each region by channel programming category.

8. The system of claim 7, wherein the communications unit transmits the expanded programming guide comprising the number of cells with content-related data for each of the plurality of channels and wherein, the processing unit is configured to receive a programming selection selecting the content-related data.

9. The system of claim 7, wherein the expanded programming guide showing the subset of the plurality of regions comprises a magnified view of the first view of the expandable programming guide.

10. The system of claim 7, wherein the processing unit dynamically configures the grid of plurality of regions by enabling, selection of at least one of the plurality of channels and the timeframe associated with each region.

11. A method for utilizing a content receiver to provide an expanded programming guide, the method comprising:

generating a programming guide comprising a grid of a plurality of regions defined by a first plurality of columns and a first plurality of rows, each column of the first plurality of columns associated with a timeframe, each row of the first plurality of rows associated with a plurality of channels, each region being defined by an intersection of a single column of the first plurality of columns and a single row of the first plurality of rows;

configuring, by the content receiver, the grid to display a first view of the plurality of regions;

receiving a search request for a television program;

marking in a first manner each region of the plurality of regions that comprises, during its respective timeframe and on a first number of its respective plurality of channels, television programs that match the search request, while not displaying any information regarding the television program that matches the search request within the regions marked in the first manner;

marking in a second manner each region of the plurality of regions that comprises, during its respective timeframe and on a second number of its respective plurality of channels, television programs that match the search request, while not displaying any information regarding the television program that matches the search request within the regions marked in the second manner, wherein the second number is greater than the first number, and wherein the second manner is visually different from the first manner;

receiving a selection of one of the marked regions;

in response to receiving the selection, generating an expanded display of the selected one of the plurality of regions relative to the remainder of the plurality of regions, thereby creating an expanded programming guide having a number of cells defined by a second plurality of columns and a second plurality of rows, each column of the second plurality of columns associated with a subset of the timeframe of the selected one of the plurality of regions, each row of the second plurality of rows associated with a subset of the plurality of channels of the selected one of the plurality of regions, each cell being defined by an intersection of a single column of the second plurality of columns and a single row of the second plurality of rows;

further in response to receiving the selection, populating a subset of the number of cells with content-related data for each of the plurality of channels in the expanded programming guide, wherein content-related data for at least one of the number of cells comprises information regarding the television program that matches the search request, the at least one of the number of cells being marked; and transmitting, from the content receiver, the expanded programming guide to a content display device.

12. The method of claim 11, further comprising displaying the first number in regions marked in the first manner and displaying the second number in regions marked in the second manner.

13. The method of claim 11, wherein marking in the first manner comprises marking with a first color, and wherein marking the second manner comprises marking in a second color that is different from the first color.

14. The method of claim 11, wherein marking in the first manner comprises marking with a first shading format, and wherein marking the second manner comprises marking in a second shading format that is different from the first shading format.

* * * * *